United States Patent
Hasegawa (10) Patent No.: US 10,644,335 B2
(45) Date of Patent: May 5, 2020

(54) FUEL CELL SYSTEM

(71) Applicant: TOYOTA JIDOSHA KABUSHIKI KAISHA, Toyota-shi, Aichi-ken (JP)

(72) Inventor: Takahiko Hasegawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 303 days.

(21) Appl. No.: 14/933,719

(22) Filed: Nov. 5, 2015

(65) Prior Publication Data

US 2016/0141664 A1    May 19, 2016

(30) Foreign Application Priority Data

Nov. 14, 2014   (JP) .................. 2014-231290

(51) Int. Cl.
| | | |
|---|---|---|
| *H01M 8/00* | (2016.01) | |
| *H01M 8/04858* | (2016.01) | |
| *H01M 8/04664* | (2016.01) | |
| *H01M 8/04228* | (2016.01) | |
| *H01M 8/1018* | (2016.01) | |
| *H01M 8/04303* | (2016.01) | |

(52) U.S. Cl.
CPC ... *H01M 8/04953* (2016.02); *H01M 8/04686* (2013.01); *H01M 8/04228* (2016.02); *H01M 8/04303* (2016.02); *H01M 2008/1095* (2013.01); *H01M 2250/20* (2013.01); *Y02T 90/32* (2013.01)

(58) Field of Classification Search
CPC ......... H01M 8/04953; H01M 8/04686; H01M 2250/20; H01M 2008/1095; H01M 8/04228; H01M 8/04303; Y02T 90/32
See application file for complete search history.

(56) References Cited

U.S. PATENT DOCUMENTS

| | | | |
|---|---|---|---|
| 8,828,568 B2 * | 9/2014 | Hasegawa | H01M 8/04947 429/7 |
| 9,889,765 B2 * | 2/2018 | Manabe | H02M 7/04 |
| 2004/0083039 A1 | 4/2004 | Hunt et al. | |
| 2007/0275276 A1 | 11/2007 | Saeki et al. | |
| 2010/0096927 A1 | 4/2010 | Miyauchi et al. | |
| 2010/0291445 A1 | 11/2010 | Igarashi | |

(Continued)

FOREIGN PATENT DOCUMENTS

| | | |
|---|---|---|
| JP | H02-311134 A | 12/1990 |
| JP | 2004-235094 A | 8/2004 |
| JP | 2005-229783 A | 8/2005 |

(Continued)

OTHER PUBLICATIONS

Machine translation of JP-2011228294-A, obtained Nov. 13, 2018 (Year: 2011).*

(Continued)

*Primary Examiner* — Nicholas P D'Aniello (74) *Attorney, Agent, or Firm* — Finnegan, Henderson, Farabow, Garrett & Dunner, LLP (57) ABSTRACT

A plurality of high voltage unit controllers each includes: a monitoring unit that monitors the hard shutdown signal sent through the dedicated wire lines; and a shutdown unit that, based on a monitoring result of the monitoring unit, stops operation of the high voltage unit that is under control of this high voltage unit controller, and further stops at least part of control functions of this high voltage unit controller.

3 Claims, 3 Drawing Sheets

(56) References Cited

U.S. PATENT DOCUMENTS

2012/0121941 A1    5/2012  Hasegawa
2015/0217660 A1*   8/2015  Manabe .................. B60L 58/40
                                                    307/23

FOREIGN PATENT DOCUMENTS

| JP | 2006-139972 A | | 6/2006 | |
|----|---------------|---|--------|---|
| JP | 2007-318938 A | | 12/2007 | |
| JP | 2009-027888 A | | 2/2009 | |
| JP | 2009-163948 A | | 7/2009 | |
| JP | 2009-283172 A | | 12/2009 | |
| JP | 2010-135258 A | | 6/2010 | |
| JP | 2011228294 A | * | 11/2011 | |
| JP | 2012-209257 A | | 10/2012 | |
| WO | WO2008-102542 A1 | | 8/2008 | |
| WO | WO2009-084649 A1 | | 7/2009 | |
| WO | WO2010/143028 A1 | | 12/2010 | |
| WO | WO 2011/013213 A | | 2/2011 | |
| WO | WO-2014013606 A1 | * | 1/2014 | .......... H01M 8/0494 |

OTHER PUBLICATIONS

Office Action issued in U.S. Appl. No. 14/414,948 dated Jun. 16, 2017 along with Interview Summary dated Sep. 11, 2017.
Notice of Allowance issued in U.S. Appl. No. 14/414,948 dated Oct. 4, 2017.
Office Action issued in U.S. Appl. No. 13/203,902 dated Dec. 23, 2013.
Notice of Allowance issued in U.S. Appl. No. 13/203,902 dated May 15, 2014.

* cited by examiner

Fig.3

FUEL CELL SYSTEM

CROSS REFERENCE TO RELATED APPLICATIONS

This application claims priority based on Japanese patent application number 2014-231290 submitted on Nov. 14, 2014, with all of that disclosure incorporated into this application by cross reference.

BACKGROUND

Field

The present invention relates to a fuel cell system.

Related Art

WO2011/013213A discloses a fuel cell system comprising a converter controller that controls the operation of a converter that increases an output voltage of a fuel cell to output to a motor, an inverter controller that controls the operation of an inverter that drives the motor, and a controller that controls the operation of the inverter controller and the converter controller. In this fuel cell system, the converter and the inverter are connected directly by a hard line (direct wire line) that does not substantially run through the converter controller and the inverter controller; accordingly, faults in either the converter or the inverter are transmitted as an error signal through the direct current line to the other, whereby both the converter and the inverter may be stopped.

JP2012-209257A discloses a fuel cell system comprising multiple controllers including a motor controller and a converter controller, and a general controller that performs overall control of the multiple controllers.

In the fuel cell systems of WO2011/013213A, if the converter has an fault, an error signal is sent from the converter to the inverter through the direct wire line, and the converter and the inverter are both stopped (hereinafter referred to as "hard stop" or "hard shutdown".) On the other hand, since the inverter controller obeys the error signal (stop signal) sent from the converter controller through the controller, the stoppage of the inverter controller (hereinafter referred to as a "soft stop" or "soft shutdown") is slower than the stoppage of the inverter. This may cause a problem because a malfunction may occur in the control operations of the inverter controller, thereby causing malfunctions in the control operations of the entire system. JP2012-209257A teaches nothing in relation to these issues.

SUMMARY

The present invention solves at least some of the above mentioned problems and may be realized by the following embodiments.

(1) According to a first aspect, there is provided a fuel cell system comprises: a plurality of high voltage units that operate at higher voltages than an output of a fuel cell; a plurality of high voltage unit controllers that control the plurality of high voltage units, respectively; a general controller that controls the plurality of high voltage unit controllers through communication lines, respectively; and a plurality of dedicated wire lines provided between the general controller and the plurality of high voltage unit controllers, or between the plurality of high voltage unit controllers themselves in order to send a shutdown signal used for stopping the plurality of high voltage unit controllers to the plurality of high voltage unit controllers. Each of the plurality of high voltage unit controllers includes: a monitoring unit that monitors the hard shutdown signal sent through the dedicated wire lines; and a shutdown unit that, based on a monitoring result of the monitoring unit, stops operation of the high voltage unit that is under control of the high voltage unit controller of interest, and further stops at least part of control functions of the high voltage unit controller of interest.

In this fuel cell system, each of the plurality of high voltage controllers monitors hard shutdown signals transmitted via dedicated wire lines and, based on the results of that monitoring, the high voltage unit controller of interest is able to stop the operation of the high voltage unit controlled by the high unit controller of interest, and further to stop the operations of at least some control functions without any command from the general controller. Accordingly, occurrence of malfunctions in the control operations of the high voltage unit controllers is thus suppressed, and occurrence of malfunctions in the control operations for the entire fuel cell system is also suppressed.

(2) In the fuel cell system, the general controller may include a hard shutdown output unit that outputs a hard shutdown signal to the plurality of high voltage unit controllers through the plurality of dedicated wire lines in response to a shutdown request sent to the general controller through the communication lines from any one of the plurality of high voltage unit controllers.

In this fuel cell system, each of the plurality of high voltage unit controllers monitors a shutdown signal sent through the dedicated wire lines from the general controller responsive to a shutdown request from the other high voltage unit controllers, and, based on the results of that monitoring, each of the plurality of high voltage unit is capable of stopping the operation of the high voltage unit. Accordingly, occurrence of malfunctions in the control operations of the high voltage unit controllers is thus suppressed, and occurrence of malfunctions in the control operations for the entire fuel cell system is also suppressed.

The present invention may be realized in various embodiments. For example, realization by various embodiments of fuel cell systems and fuel cell system control methods, etc.

DESCRIPTION OF THE EMBODIMENTS

Figure 1:
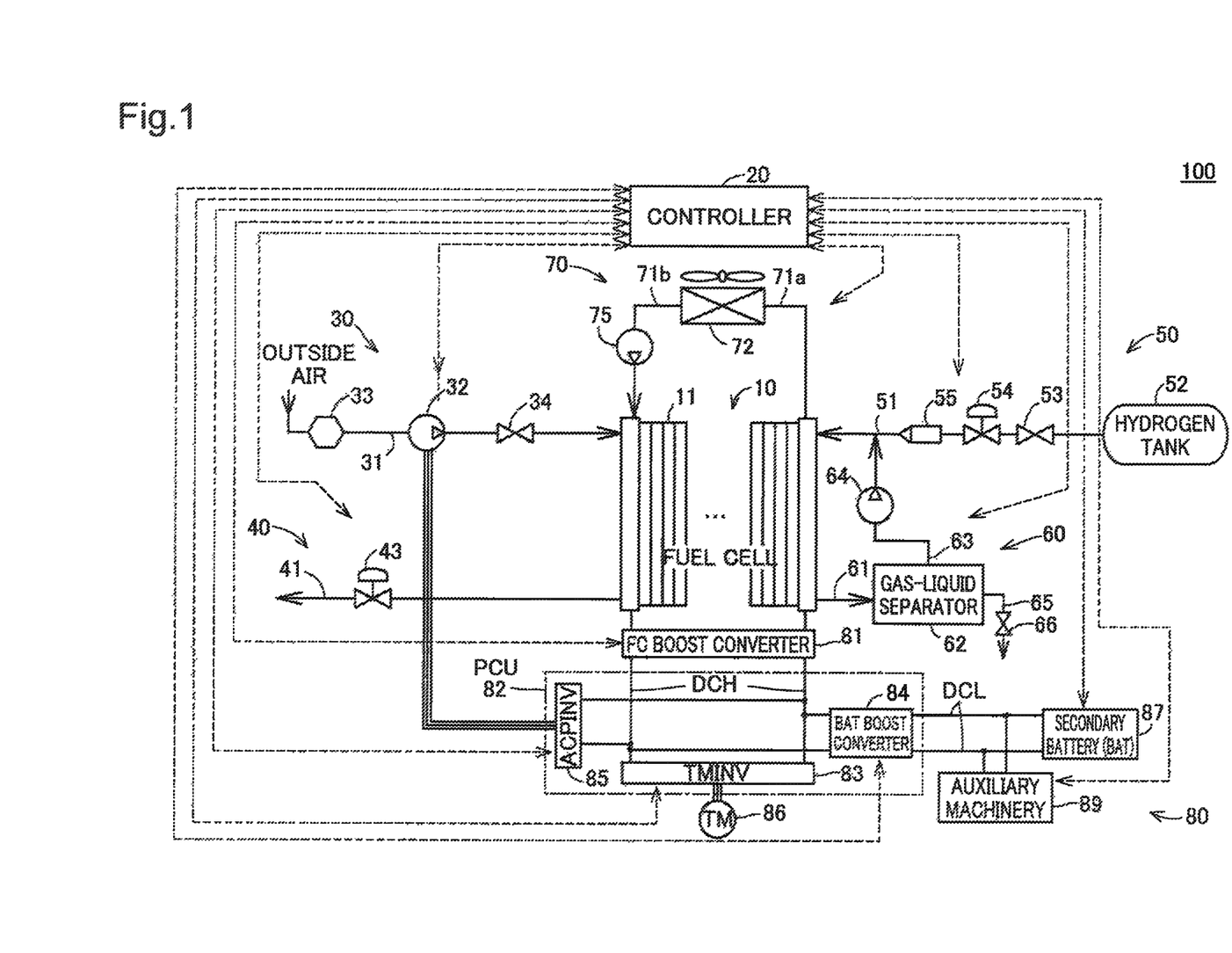
FIG. 1 schematically shows the composition of a fuel cell system as an embodiment of the present invention.

The following abbreviations are used for embodiments,
ACP: Air compressor
BAT: Secondary battery
ECU: Electronic Control Unit
FC: Fuel cell
MC: Micro computer
PCU: Power control unit
TM: Drive motor
FDC-ECU: FC boost converter controller
MG-ECU: Power control unit controller
PM-ECU: General controller SD: Shutdown
SSD: Soft shutdown
HSD: Hard shutdown FIG. 1 is a schematic view showing the composition of a fuel cell system 100 as an embodiment of the present invention. In this embodiment, the fuel cell system 100 is mounted on vehicles (also called "fuel cell vehicles"). The fuel cell system 100 outputs electrical power that serves as the driving force for the vehicle in response to requests by stepping operations of an accelerator pedal by the driver of the vehicle (hereinafter, the stepping amount on the accelerator pedal is referred to as "accelerator position").

The fuel cell system 100 includes a fuel cell (FC: Fuel Cell) 10, a controller 20, a cathode gas supply system 30, a cathode gas exhaust system 40, an anode gas supply system 50, an anode gas circulation system 60, a coolant circulation system 70, and an electric power system 80.

The fuel cell 10 is a polymer electrolyte fuel cell that receives a supply of hydrogen as fuel gas (also called "anode gas") and air (strictly speaking, oxygen) as oxide gas (also called "cathode gas"). The fuel cell 10 has a stacked structure of plural single cell 11. The fuel cell 10 further has manifolds for reactive gases and coolants as through-holes along the stacking direction, but they are omitted from the diagram.

The single cell 11 is omitted from the diagram, but, in general, it is comprised of a membrane-electrode assembly (MEA) as a power generating body sandwiched by separators. The MEA is comprised of a polymer electrolyte membrane (simply called "electrolyte membrane") containing an ion exchange membrane, an anode containing a catalyst layer and a gas diffusion layer formed on the anode-side surface of the electrolyte membrane, and a cathode containing a catalyst layer and a gas diffusion layer formed on the cathode side surface of the electrolyte membrane. Also, gas flow paths are formed on the surface of the separator contacting the gas diffusion layers that transport anode gas and cathode gas. However, there are cases in which separate gas flow path layers are disposed between the separators and the gas diffusion layers.

The controller 20 is a control device that controls the cathode gas supply system 30, the cathode gas exhaust system 40, the anode gas supply system 50, the anode gas circulation system 60, the coolant circulation system 70 and the electrical system 80, thereby making the fuel cell to generate electricity in accordance with output demands on the system from the exterior. This controller 20 will be discussed below.

The cathode gas supply system 30 includes cathode gas piping 31, an air compressor (ACP) 32, an airflow meter 33, and an open-close valve 34. The cathode gas supply piping 31 is connected to the cathode gas supply manifold of the fuel cell 10.

The air compressor 32 is connected to the fuel cell 10 through the cathode gas supply piping 31. The air compressor 32 draws in air from outside and supplies pressurized air as the cathode gas to the fuel cell 10. The airflow meter 33 measures the amount of air taken-in by the air compressor 32 on the upstream side of the air compressor 32, and transmits to the controller 20. The amount of air supplied to the fuel cell 10 is controlled by the controller 20 based on the measured values of the airflow meter 33. The open-close valve 34 is disposed between the air compressor 32 and the fuel cell 10. The open-close valve 34 is normally in a closed state and opens when air with a designated air pressure is supplied from the air compressor 32 to the cathode gas supply piping 31.

The cathode exhaust gas system 40 includes cathode exhaust gas piping 41 and a pressure control valve 43. The cathode exhaust gas piping 41 is connected to the cathode gas exhaust manifold of the fuel cell 10. The cathode exhaust gas (also called the "cathode-off gas") is expelled to the exterior of the fuel cell system 100 through the cathode exhaust gas piping 41. Cathode exhaust gas pressure in the cathode exhaust piping 41 (the back pressure of the fuel cell 10's cathode side) is adjusted by controlling the opening degree of the pressure control valve 43 by the controller 20.

The anode gas system 50 includes anode gas supply piping 51, a hydrogen tank 52, an open-close valve 53, a regulator 54 and a hydrogen supply device 55. The hydrogen tank 52 is connected to the inlet of the anode gas supply manifold of the fuel cell 10 (diagram omitted) through the anode gas supply piping 51, supplying the fuel cell 10 with the hydrogen gas that fills the tank. There are disposed on the anode gas supply piping 51, in the descending order from the upstream side (the hydrogen tank 52 side), the open-close valve 53, the regulator 54 and the hydrogen supply device 55. The open-close valve 53 is opened and closed by command from the controller 20, and controls in-flow of hydrogen from the hydrogen tank 52 to the upstream side of the hydrogen supply device 55. The regulator 54 is a pressure reduction valve that adjusts hydrogen pressure at the upstream side of the hydrogen supply device 55, and its opening degree is controlled by the controller 20. The hydrogen supply device 55 may be, for example, comprised of a injector that is an electromagnetically driven valve, and the flow rate of hydrogen supplied from the hydrogen supply device 55 to the fuel cell 10 may be controlled by the controller 20.

The anode gas circulation system 60 includes anode exhaust gas piping 61, a gas-liquid separator 62, anode gas circulation piping 63, a hydrogen circulation pump 64, anode drain piping 65 and a drain valve 68. The anode gas circulation system 60 performs the circulation and discharge of anode exhaust gas (also called "anode-off gas") including water discharge as well as unreacted gases (hydrogen and nitrogen, etc.) that are not used in power generation reaction from the anode of the fuel cell 10.

The anode exhaust gas piping 61 connects the gas-liquid separator 62 and the outlet of the anode gas exhaust manifold (diagram omitted) of the fuel cell 10. The gas-liquid separator 62 is connected to the anode gas circulation piping 63 and the anode drain piping 65. The gas-liquid separator 62 separates the gas components and water content contained in the anode exhaust gas, conveys the gas components to the anode gas circulation piping 63, and conveys the water content to the anode drain piping 65.

The anode gas circulation piping 63 is connected to the anode gas supply piping 51 at a position downstream of the hydrogen supply device 55. The anode gas circulation piping 63 is provided with the hydrogen circulation pump 64. Hydrogen contained in the gas components separated by the gas-liquid separator 62 is sent to the anode gas supply piping 51 by the hydrogen pump 64 and re-used as anode gas.

The anode drain piping 65 is for discharging water content separated by the gas-liquid separator 62 to the exterior of the fuel cell system 100. The anode drain piping 65 is provided with a drain valve 66. The drain valve 66 is normally closed by the controller 20, remains closed, and opens based on a pre-determined setting of drainage timing or the timing of discharge of inert gases contained in the anode gas.

The coolant circulation system 70 includes upstream-side piping 71a, downstream-side piping 71b, a radiator 72 and a coolant circulation pump 75. The upstream-side piping 71a and the downstream-side piping 71b are each coolant pipes that are for the circulation of coolant to cool the fuel cell 10. The upstream-side piping 71a is connected to the inlet of the radiator 72 and the outlet of the coolant discharge manifold of the fuel cell 10 (diagram omitted). The downstream-side piping 71b is connected to the outlet of the radiator 72 and the inlet of the coolant supply manifold of the fuel cell 10 (diagram omitted).

The radiator 72 cools the coolant by heat exchange between the coolant flowing through the coolant piping 71 and the exterior air. The coolant pump 75 is disposed midway on the downstream-side piping 71b and sends coolant cooled by the radiator 72 to the fuel cell 10. The action of the radiator 72 is controlled by the controller 20 based on coolant temperature.

The electric power system 80 includes an FC boost converter 81, a power control unit (PCU) 82, a drive motor (TM) 86 as a load device, a secondary battery (BAT) 87, and auxiliary machinery 89. The power control unit 82 includes a TM inverter (abbreviated to "TMINV") 83, a BAT boost converter 84 and an ACP inverter (abbreviated to "ACP-INV") 85. The FC boost converter 81, the TM inverter 83, the BAT boost converter 84 and the ACP inverter 85 are each connected to a high voltage direct current line DHC. The secondary battery 87 is connected to the BAT boost converter 84 through a low voltage direct current line DCL. The auxiliary machinery 89 is connected to the low voltage direct current line DCL.

The secondary battery 87 is charged by the electrical power output of the fuel cell 10 or the regenerative electrical power of the drive motor 86, and functions as an electrical power source together with the fuel cell 10. The secondary battery 87 may be, for example, composed of a lithium ion battery.

Based on commands from the controller 20, the battery boost converter 84 controls current and voltage of the fuel cell 10, controls charge and discharge of the secondary battery 87, and variably adjusts the voltage level of high voltage direct current line DHC. The TM inverter 83 converts direct-current power obtained from the fuel cell 10 and the secondary battery 87 into AC power, and supplies the power to the drive motor 86 to drive the drive motor 86. The drive motor 86 drives wheels (not shown) connected through gears and the like in accordance with electrical power supplied from the TM inverter 83 responsive to an accelerator position. In cases where regenerative electrical power is generated by the drive motor 86, the TM inverter 83 converts that regenerative electrical power into direct-current power and charges the secondary battery 87 through the BAT boost converter 84. The ACP inverter 85 converts direct-current power obtained from the fuel cell 10 and the secondary battery 87 into AC power, and supplies it to the air compressor 32 to drive the air compressor 32.

The auxiliary machinery 89 includes drive circuits of various actuators required for power generation by the fuel cell 10, such as the hydrogen pump 64 and the coolant circulation pump 75 etc., various devices required for vehicle travel, such as wheel control devices and steering devices, air conditioning and lighting devices, and devices equipped in the vehicle interior such as audio devices and the like.

In the fuel cell system 100 described above, the cathode gas supply system 30 and the cathode gas exhaust system 40, the anode gas supply system 50 and the anode gas circulation system 60, along with the electric power system 80 are controlled by the controller 20 in accordance with the accelerator position, and electrical power as the vehicle's driving power is output from the fuel cell 10 to drive the drive motor 86.

Figure 2:
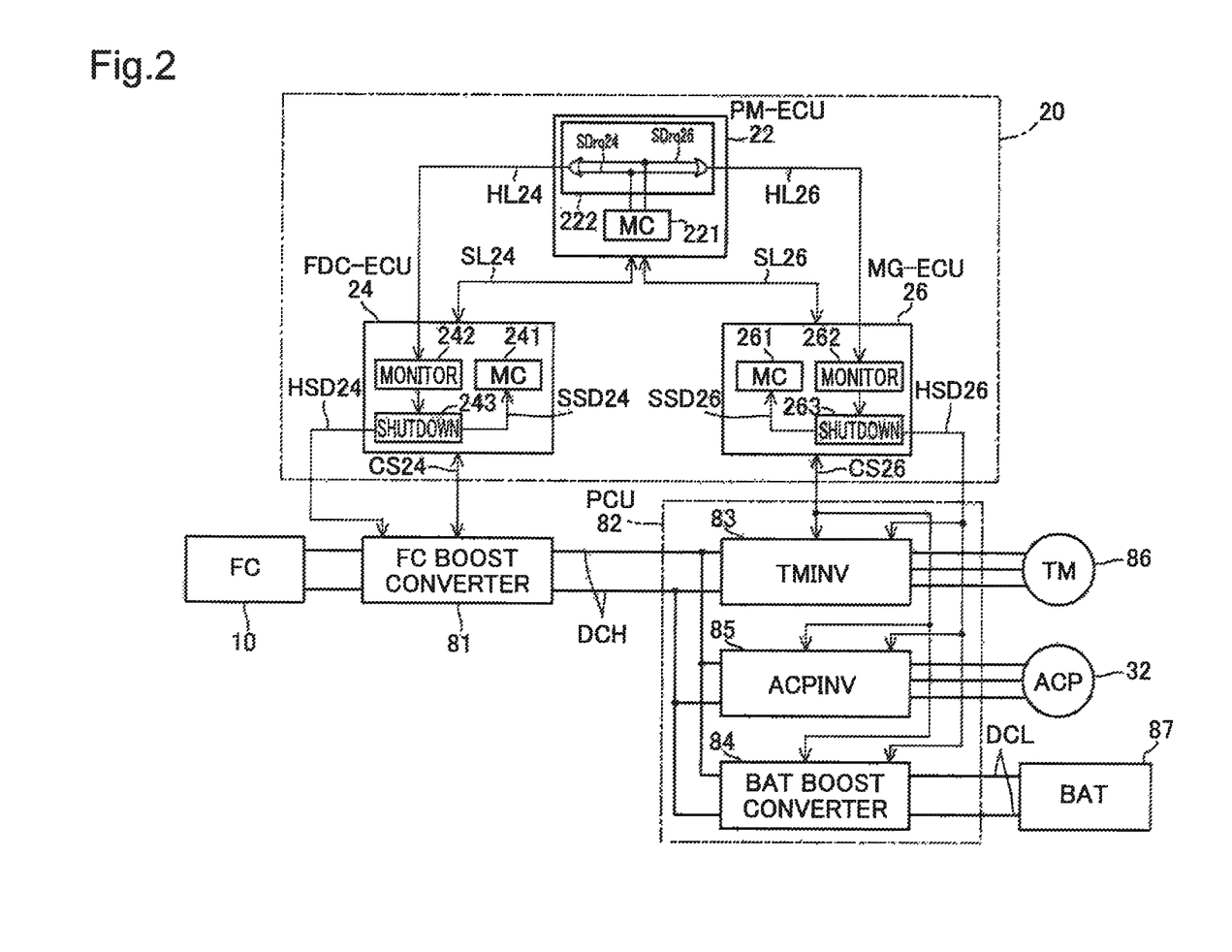
FIG. 2 is an explanatory drawing showing an example of the interior composition of the controller controlling the FC boost converter and PCU shown in FIG. 1.

FIG. 2 is a schematic view showing an example of the internal structure of the controller 20 shown in FIG. 1 which controls the FC boost converter 81 and the PCU 82. The controller 20 includes a PM-ECU 22, an FDC-ECU 24 and an MG-ECU 26. The FC boost converter 81 and the PCU 82 (including the TM inverter 83, the ACP inverter 85 and the BAT boost converter 84) corresponds to a plurality of high voltage units that operate at higher voltages than the fuel cell 10.

The FDC-ECU (FC boost converter controller) 24 is a high voltage unit controller that controls operation of the FC boost converter 81. The MG-ECU (power control unit controller) 26 is a high voltage unit controller that controls operation of the PCU 82. The PM-ECU 22 is a general controller that generally controls operation of the FDC-ECU 24 and the MG-ECU 26. Furthermore, the PM-ECU 22 also generally controls various types of controllers (ECU) not shown, like the FC controller that controls auxiliary machinery 89, but these elements do not require explanation in the present invention so diagrams and explanations are omitted.

The FDC-ECU 24 is connected to the PM-ECU 22 with a control signal line SL24, and is configured to send and receive control signals with the PM-ECU 22. The FDC-ECU 24 is also connected to the FC boost converter 81 with a control signal line CS24, and is configured to output a control signal to the FC boost converter 81 and receive a status signal from the FC boost converter 81 indicating the status of the FC boost converter 81. In other words, the FDC-ECU 24 has functions of sending and receiving control signals with the PM-ECU 22 and of controlling operation of the FC boost converter 81.

The MG-ECU 26 is connected to the PM-ECU 22 with a control signal line SL26, and is configured to send and receive control signals with the PM-ECU 22. The MG-ECU 26 is also connected to the TM inverter 83, the ACP inverter 85 and the BAT boost converter 84 in the PCU 82 with a control signal line CS26, and is configured to output a control signal to the TM inverter 83, the ACP inverter 85 and the BAT boost converter 84 and receive status signals from the TM inverter 83, the ACP inverter 85 and the BAT boost converter 84, indicating the states of each. That is, the MG-ECU 26 has functions of sending and receiving control signals with the PM-ECU 22 and of controlling operations of the TM inverter 83, the drive motor 86, the ACP inverter 85, the air compressor 32, the BAT boost converter 84 and actuators for the secondary battery 87. The control signal line SL24 and SL26 are also called "communication lines".

The FDC-ECU 24 is further connected to the PM-ECU 22 with a dedicated wire line HL24 and is configured to receive a hard shutdown (HSD) signal from the PM-ECU 22. The FDC-ECU 24 is also connected to the FC boost converter 81 with a dedicated wire line HSD24 and is configured to output an HSD signal to the FC boost converter 81. Similarly, the MG-ECU 26 is connected to the PM-ECU 22 with a dedicated wire line HL26 and is configured to receive an HSD signal from the PM-ECU 22. The MG-ECU 26 is also connected to the TM inverter 83, the ACP inverter 85, and the BAT boost converter 84 with a dedicated wire line HSD26 and is configured to output an HSD signal to them. Hereinafter, the TM inverter 83, the BAT boost converter 84 and the ACP inverter 85 are collectively referred to as the "PCU 82" when no particular distinction is made. The dedicated wire lines HSD24, HL24, HSD26 and HL26 denote hard wire lines (direct wire lines) directly connecting devices. The dedicated wire lines HL24 and HL26 correspond to the "dedicated wire lines" of the claimed invention.

The PM-ECU 22 includes a microcomputer (MC) 221 and a hard shutdown (HSD) output unit 222 that sends an HSD signal to the MG-ECU 26 through the dedicated wire line HL26 and outputs an HSD signal to the FDC-ECU 24 through the dedicated wire line HL24. The MC 221 produces a first HSD request SDrq24 in response to a shutdown (SD) request received from the FDC-ECU 24 and supplies it to the HSD output unit 222. The MC 221 further produces a second HSD request SDrq26 in response to an SD request from the MG-ECU 26 and supplies it to the HSD output unit 222. The HSD output unit 222 produces an OR signal by taking a logical sum (OR) of these HSD requests SDrq24 and SDq26. This OR signal is produced for each of the dedicated wire lines HL24 and HL26, and the HSL) output unit 222 outputs these OR signals over the dedicated wire lines HL24 and HL26 as separate HSD signals. Thus, when at least one of the two HSD requests SDrq24 and SDrq26 is supplied from the MC 221 to the HSD output unit 222, the HSD signals each indicating an HSD request are output from the HSD output unit 222 to both the FDC-ECU 24 and the MG-EGU 26 through the dedicated wire lines HL24 and HL26. Accordingly, if a shutdown request is issued to the PM-ECU 22 from the FDC-ECU 24, for example, an HSD signal is output from the PM-ECU 22 not only to the FDC-ECU 24 but also to the MG-ECU 26. Similarly, if a shutdown request is issued to the PM-ECU 22 from the MG-ECU 26, an HSD signal is output from the PM-ECU 22 not only to the MG-ECU 26 but also to the FDC-ECU 24.

The FDC-ECU 24 includes an MC 241, a monitoring unit 242 and a shutdown unit 243. The monitoring unit 242 monitors HSD signals sent from the PM-ECU 22 through the dedicated wire line HL24. Based on the monitoring results from the monitoring unit 242, that is, upon receiving an HSD signal indicating an HSD request, the shutdown unit 243 sends an HSD signal to the FC boost converter 81 through the dedicated wire line HSD24, and also outputs a soft shutdown (SSD) signal to the MC 241 through the control signal line SSD24. The FC boost converter 81, upon receiving the HSD signal, stops its operation (hard shutdown). The MC 241, upon receiving the SSD signal, shuts down part of the control operations of the FC boost converter 81 (soft shutdown). For example, the MC 241 that has received an SSD signal stops the feedback control operation for controlling the boosted voltage. The MC 241 stops only part of the control operations, but continues the other control operations.

Similarly, the MG-ECU 26 includes an MC 261, a monitoring unit 262 and a shutdown unit 263. Similarly to the monitoring unit 242, the monitoring unit 262 monitors HSD signals sent from the PM-ECU 22 through the dedicated wire line HL26. Based on the monitoring results of the monitoring unit 262, that is, upon receiving an HSD signal indicating an HSD request, the shutdown unit 263 sends an HSD signal to the PCU 82 through the dedicated wire line HSD26, and also outputs an SSD signal to the MC 261 through the control signal line SSD26. The PCU 82, upon receiving an HSD signal, stops its operations. The MC 261, upon receiving an SSD signal, stops part of its control operations. For example, the MC 261 that has received an SSD signal stops the feedback control operation of the TM inverter 83 controlling the drive motor 86, and stops the feedback control operation of the ACP inverter 85 controlling the air compressor 32, and stops the feedback control operation of the BAT boost converter 84 controlling the charge and discharge of the secondary battery 87. The MC 261 stops only part of the control operations, but continues the other control operations.

Figure 3:
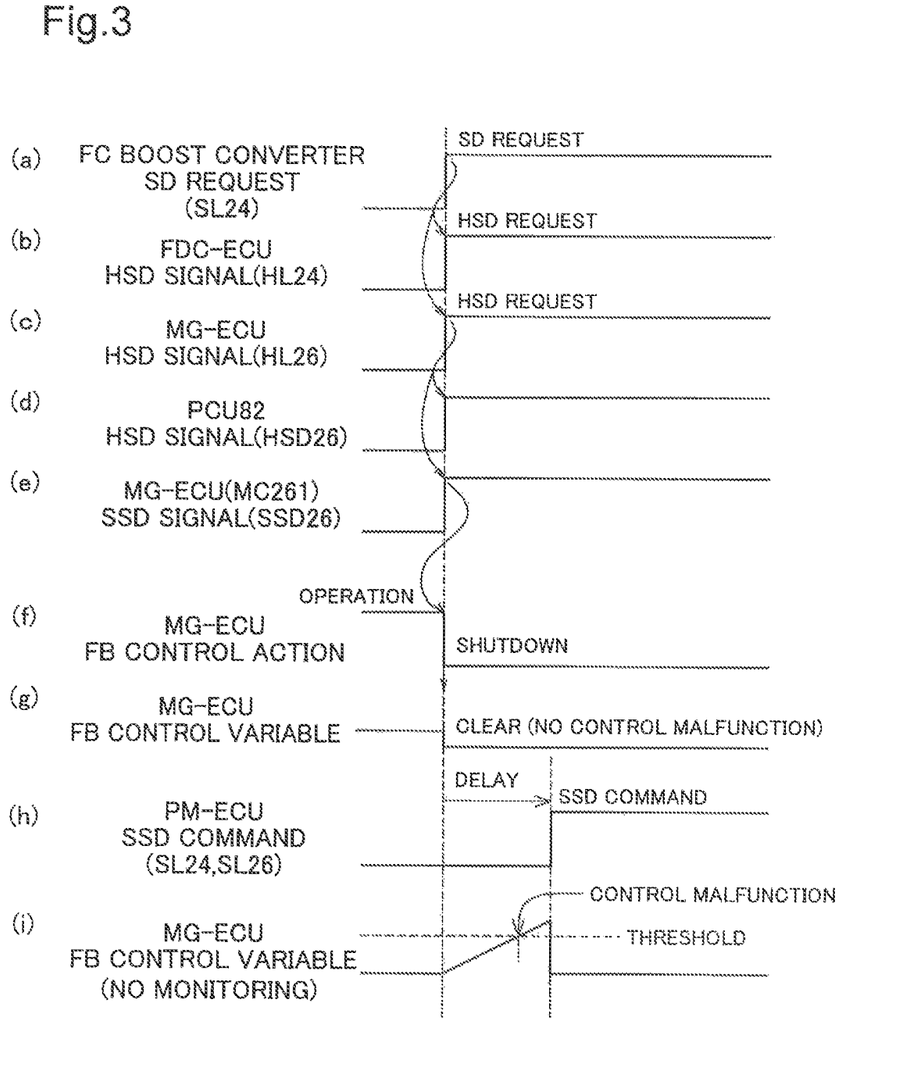
FIG. 3 is an explanatory drawing showing PCU shutdown operation executed in accordance with FC boost converter shutdown.

FIG. 3 is an explanatory drawing showing a shutdown operation of the PCU 82 executed responsive to a shutdown operation of the FC boost converter 81. In the example of FIG. 3, a shutdown request for shutting down the FC boost converter 81 is first issued from the FDC-ECU 24 to the PM-ECU 22 responsive to a fault of the FC boost converter 81, and the shutdown request causes a hard shutdown operation of the PCU 82 and a soft shutdown operation of the MG-ECU 26.

If a fault occurs in the FC boost converter 81 and the fault is detected by the FDC-ECU 24, as shown in FIG. 3(a), the FDC-ECU 24 issues a shutdown (SD) signal for shutting down the FC boost converter 81 to the PM-ECU 22 through the control signal line SL24. Responsive to this SD request, the MC 221 of the PM-ECU 22 issues an HSD request SDrq24 for shutting down the FC boost converter 81 to the HSD output unit 222. As described above, in cases where at least one of either HSD request SDrq24 to the FC boost converter or HSD request SDrq26 to the PCU 82 is received from the MC 221, the HSD output unit 222 outputs HSD signals indicating an HSD request to both the FDC-ECU 24 and the MG-ECU 26 through the dedicated wire lines HL24 and HL26. Accordingly, in response to an SD request related to the FC boost converter 81 (FIG. 3(a)), an HSD signal (FIG. 3(b)) is sent to the FDC-ECU 24, and another HSD signal (FIG. 3(c)) is also sent to the MG-ECU 26.

In the MG-ECU 26, the monitoring unit 262 monitors the HSD signal sent from the PM-ECU 22 through the dedicated wire line HL26. When the monitoring unit 262 detects an HSD request, the shutdown unit 263 sends an HSD signal (FIG. 3(d)) to the PCU 82 through the dedicated wire line HSD26, and also outputs an SSD signal (FIG. 3(e)) to the MC 261 through the control signal line SSD26. As such, the PC 82 stops the operations (hard shutdown) of each unit (the high voltage units 83, 84 and 8), and the MG-ECU 26 stops (soft shutdown) operation of each of the PCU 82's feedback (FB) control functions (also called "FB control operations") as in FIG. 3(f), and clears FB control variables as shown in FIG. 3(g).

Also, not shown in the drawing, but the FDC-ECU 24 also operates in the same manner as the MG-ECU 26; the shutdown unit 243 sends an HSD signal to the FC boost converter 81 through the dedicated wire line HSD24, and also outputs an SSD signal to the MC 241 through control signal line SSD24. As such, the FC boost converter 81 stops (hard shutdown) its operations, and the FDC-ECU 24 stops (soft shutdown) the FC boost converter 81's FB control operations, and clears FB control variables. Note that in the example of FIG. 3, since the FDC-ECU 24 outputs a shutdown request in response to detection of a fault of the FC boost converter 81, the MC 241 may stop FB control operations without having to receive an SSD signal from the shutdown unit 243.

Incidentally, upon receiving an SD request (FIG. 3(a)) from the FDC-ECU 24 or the MG-ECU 26, the PM-ECU 22 sends an SSD command (FIG. 3(h)) to the FDC-ECU 24 and the MG-ECU 26 through the control signal line SL24, SL 26. Note that there is a delay as shown in FIG. 3(h) from the timing of the PM-ECU 22 receiving an SD request (FIG. 3(a)) until it sends an SSD command to the FDC-ECU 24 and the MG-ECU 26. Here assume that the process of monitoring an HSD signal and stopping FB control operations mentioned above is not performed. In this case, since the FDC-ECU 24 itself outputs an SD request (FIG. 3(a))

and is able to respond to its own SD request output and stop FB control operations, there is no problem with respect to the FDC-ECU 24. However, the MG-ECU 26 has not detected a fault of the PCU 82 in this case, so even if the operations of each part of the PCU 82 stop (hard shutdown), the FB control operations would continue as normal until the SSD command (FIG. 3(h)) is received from the PM-ECU 22. As a result, as shown in FIG. 3(i), the FB control variables would accumulate, and if that accumulation surpasses a threshold a control malfunction occurs and it is possible for malfunction to occur in the control operations of the entire system.

On the contrary, in the present embodiment, the MG-ECU monitors HSD signals, and based on the monitoring results the MG-ECU is able to perform hard shutdown of the PCU 82, and execute a soft shutdown of control operations without waiting for an SSD signal sent from the PM-ECU 22. Therefore, it is possible to suppress the aforementioned control malfunction from occurring.

Also, not shown in the drawings, when a shutdown request for shutting down the PCU 82 is sent to the PM-ECU 22 from the MG-ECU 26 in accordance with a fault of the PCU 82, a hard shutdown operation of the FC boost converter 31 and a soft shutdown operation of the FDC-ECU 24 are performed in the same manner. In this case also, it is possible to suppress control malfunction as described above.

As explained above, in the present embodiment, the high voltage unit controllers 24 and 26 monitor the hard shutdown signals sent from the general controller 22 to the high voltage unit controllers 24 and 26 through dedicated wire lines when a shutdown request is sent to the general controller through the communication line from any one of the high voltage controllers 24 (or 26). Then, based on the results of that monitoring, the high voltage unit controllers 24 and 26 output a hard shutdown signal to the corresponding high voltage units 81 and 82 to stop (hard shutdown) their operations, and further to stop (soft shutdown) at least part of the control operations of the high voltage units, for example, FB control operations. Accordingly, one high voltage unit controller 24 (or 26) may stop control operations of the high voltage unit 81 (or 82) that is controlled by the high voltage unit controller 24 (or 26) without waiting for a shutdown command sent from the general controller 22 through the communication line, even in cases where a shutdown request has been sent to the general controller 22 from the other high voltage unit controller 26 (or 24). This suppresses a control operation malfunction which may occur when the control operations continue until the shutdown command is sent from the general controller 22 while the high voltage unit 81 (or 82) has been already shutdown, thereby suppressing a control operation malfunction in the entire fuel cell system.

In the above embodiment, the HSD output unit 222 of the general controller (PM-ECU 22) is configured to produce HDS signals for the dedicated wire lines HL24 and HL26 using the two OR circuits each making a logical sum signal of the HSD requests SDrq24 and SDrq26, respectively. In place of this, it may be configured such that after producing an HSD signal using a single OR circuit for making a logical sum signal of the SD requests SDrq24 and SDrq26, and a dedicated wire line outputting an HSD signal from the PM-ECU 22 branches off to the dedicated wire lines HL24 and HL26.

Further, a single dedicated wire line branched into plural dedicated wire lines may be applied; that is, it may be configured such that the plurality of high voltage unit 24s, 26s and the general controller 22 each is capable of sending and receiving an HSD signal through the plural dedicated wire lines connecting between the plurality of high voltage unit 24s, 26s and the general controller 22. In this case, for example, if one high voltage unit controller 24 (or 26) monitors an HSD signal output from another high voltage unit controller 26 (or 24), based on the monitoring results, hard shutdown of the high voltage unit 81 (or 82) controlled by the one high voltage controllers 24 (or 26) may be performed. Also, the general controller 22 may receive an HSD signal output from one high voltage unit controllers 24 (or 26) and execute a required process in response. Also, it is possible to connect the plurality of high voltage controller unit 24 and 26 with each other through plural dedicated wire lines, while excluding the dedicated wire lines with the general controller 22.

Also, the above embodiment is structured such that the shutdown unit 263 of the MG-ECU 26 sends an HSD signal to the PCU 82 through the dedicated wire line HSD26 based on the monitoring results of the monitoring unit 262, and the shutdown unit 243 of the FDC-ECU 24 sends an HSD signal to the FC boost converter 81 through the dedicated wire line HSD24 based on the monitoring results of the monitoring unit 242. These HSD signals sent through these dedicated wire lines HSD24 and HSD26 may be HSD signals sent through the dedicated wire lines HL24 and HL26 sent through as-is, or they may be signals produced in response to HSD signals sent through the dedicated wire lines HL24 and HL26.

The above embodiment is described with two high voltage unit controllers including the FDC-ECU 24 and the MG-ECU 26 as examples, but not being limited to this, and the present invention may be applied to a plurality of high voltage unit controllers controlling a plurality of high voltage units operating at higher voltages than the fuel cell 10. For example, the TM inverter (TMINV) 83, the BAT boost converter 84, and the ACP inverter (ACPINC) 85 included in the PCU 82 each may have separate high voltage unit controllers.

Also, in the above embodiment, explanations were given with an example of a fuel cell system installed on a fuel cell vehicle, but not limited to this, application is possible to fuel cell systems installed on a variety of devices. Also, in the above embodiment, functions and processes implemented in part or in whole by software may be implemented by hardware. Also, in the above embodiment, functions and processes implemented in part or in whole by hardware may be implemented by software. As hardware, for example, integrated circuits, discreet circuits, or circuit modules combining those circuits etc., every kind of circuitry (circuitry) may be utilized.

The present invention is not limited to the aforementioned embodiments or variations, and may be implemented through a variety of structures without departing from the scope thereof. For example, to solve the aforementioned problems in part or in whole or to achieve the aforementioned results in part or in whole, technical features in modifications and embodiments corresponding to technical features in each embodiment entered in the invention summary column may be exchanged and combined as required. Also, when the specific technical feature is not described as necessary in these specifications, it may be omitted.

What is claimed:
1. A fuel cell system comprising:
a fuel cell;
a plurality of voltage units that operate at higher voltages than an output voltage of the fuel cell;

a plurality of voltage unit controllers configured to control the plurality of voltage units, respectively;

a general controller configured to control the plurality of voltage unit controllers through communication lines by sending control signals which are different from a hard shutdown signal, respectively; and a plurality of dedicated wire lines which are different from the communication lines connected between the general controller and the plurality of voltage unit controllers, or between the plurality of voltage unit controllers themselves, the plurality of dedicated wire lines being configured to send the hard shutdown signal to stop the plurality of voltage unit controllers to the plurality of voltage unit controllers and being configured such that the plurality of voltage unit controllers and the general controller are each capable of respectively sending and receiving the hard shutdown signal through the plurality of dedicated wire lines connecting between the plurality of voltage unit controllers and the general controller, wherein each of the plurality of voltage unit controllers includes:

a monitoring circuitry configured to monitor the hard shutdown signal sent from the general controller through the dedicated wire lines which stops voltage unit operation; and a shutdown circuitry configured to stop, based on a monitoring result of the monitoring circuitry, operation of one of the voltage units that is under control of a respective one of the voltage unit controllers, via the hard shutdown signal, and further configured to stop, via a soft shutdown signal, a feedback control function of the respective one of the voltage unit controllers for controlling the one of the voltage units and stop operation of one or more control functions without a command from the general controller through the communication lines.

2. The fuel cell system according to claim 1, wherein the general controller includes a hard shutdown output circuitry configured to output the hard shutdown signal to the plurality of voltage unit controllers through the plurality of dedicated wire lines in response to a shutdown request sent to the general controller through the communication lines from any one of the plurality of voltage unit controllers.

3. The fuel cell system according to claim 1, wherein each of the plurality of voltage unit controllers outputs the hard shutdown signal to the other voltage unit controllers through the plurality of dedicated wire lines.

* * * * *